Feb. 16, 1954

R. WALLNER 2,669,460

CHILD'S STROLLER

Filed June 17, 1948

INVENTOR.
BY Rudolph Wallner

*Eugene H. Simpson*

ATTORNEY

Feb. 16, 1954   R. WALLNER   2,669,460
CHILD'S STROLLER
Filed June 17, 1948   2 Sheets-Sheet 2
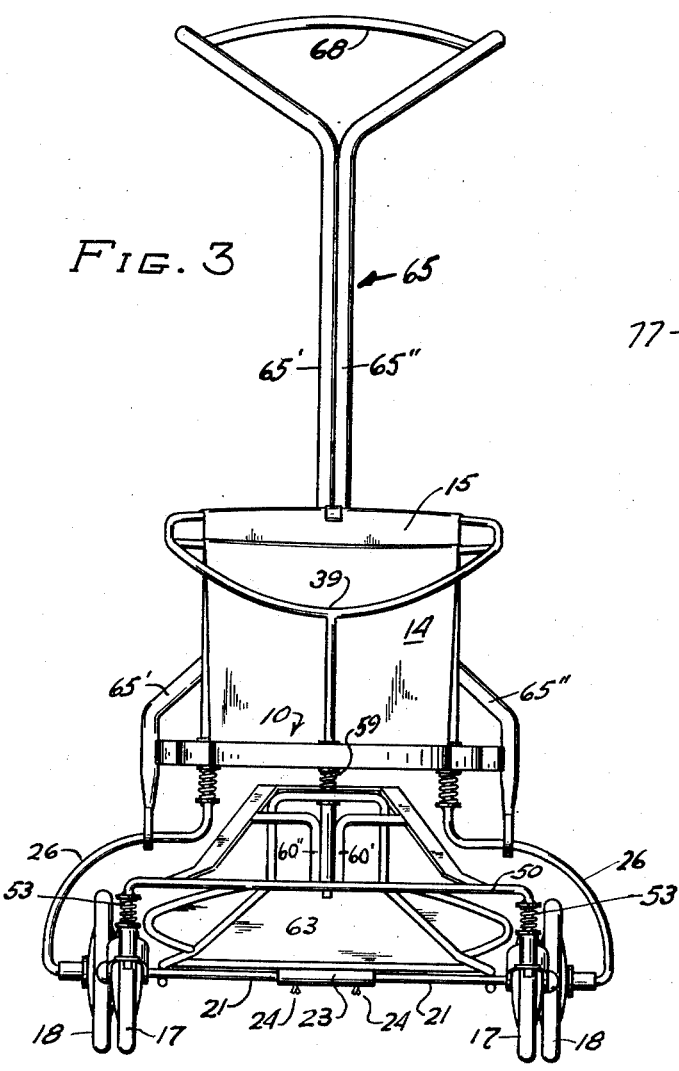
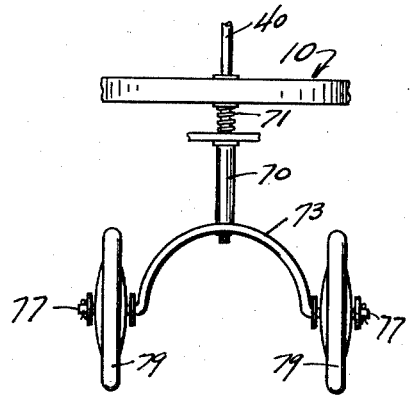
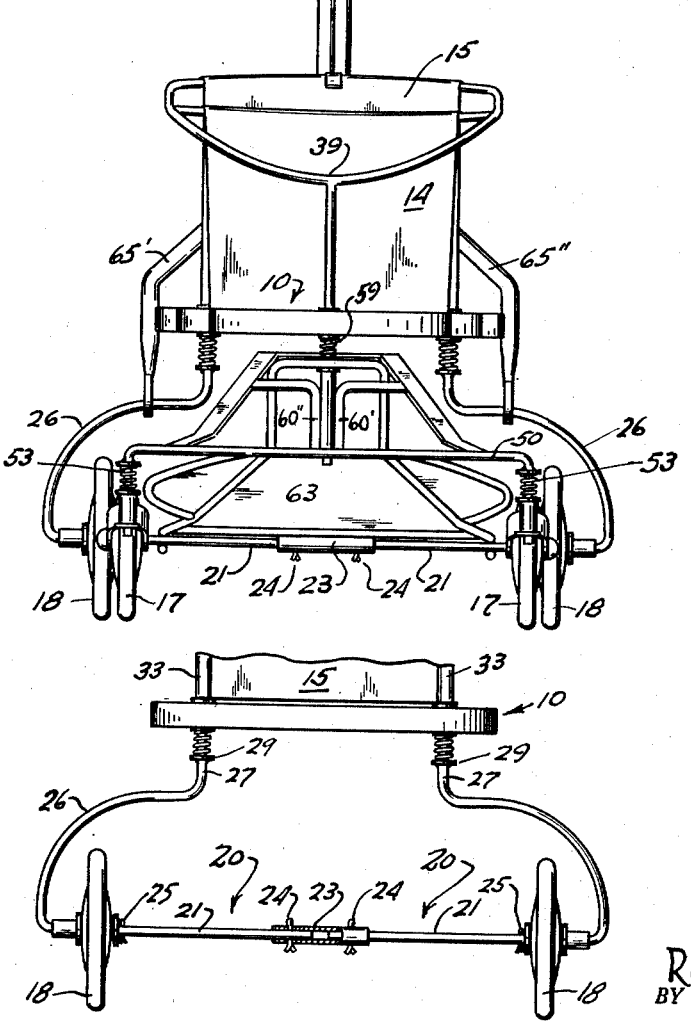
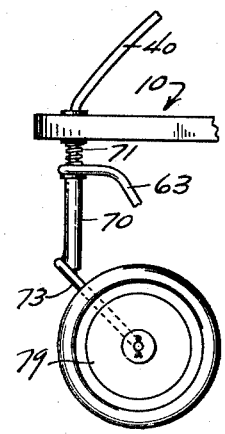
INVENTOR.
Rudolph Wallner
BY
Eugene U. Simpson
ATTORNEY Patented Feb. 16, 1954

2,669,460

UNITED STATES PATENT OFFICE 2,669,460

CHILD'S STROLLER

Rudolph Wallner, Sheboygan, Wis.

Application June 17, 1948, Serial No. 33,609

7 Claims. (Cl. 280—47.38)

This invention relates to strollers of the type which may be propelled by a child while seated in the stroller or which may be propelled by an adult.

It is an object of this invention to provide a baby walker or stroller which may conveniently carry more than one child.

Another object is to provide a stroller in which two children may be seated in tandem seats.

Another object is to provide a stroller having an improved wheel mounting.

A further object is to provide a stroller having an improved spring construction.

A further object is to provide a stroller having an improved front wheel suspension.

A still further object is to provide a stroller or baby walker which will be more economical to manufacture.

A still further object is to provide a stroller or baby walker which will be strong and sturdy, and yet light in weight.

Other objects will become apparent upon considering the following specification.

A structure embodying the invention is illustrated in the accompanying drawings and will be fully described hereinafter, the invention residing in certain novel features which will be particularly pointed out in the appended claims.

In the drawings:

Fig. 3 is a front view of the walker shown in Fig. 1;

Fig. 4 is a detail of the rear axle and is a rear view of the walker with other parts broken away;

Fig. 5 is a front view of a modified form of front wheel suspension; and

Fig. 6 is a side view of the structure shown in Fig. 5.

Figure 1:
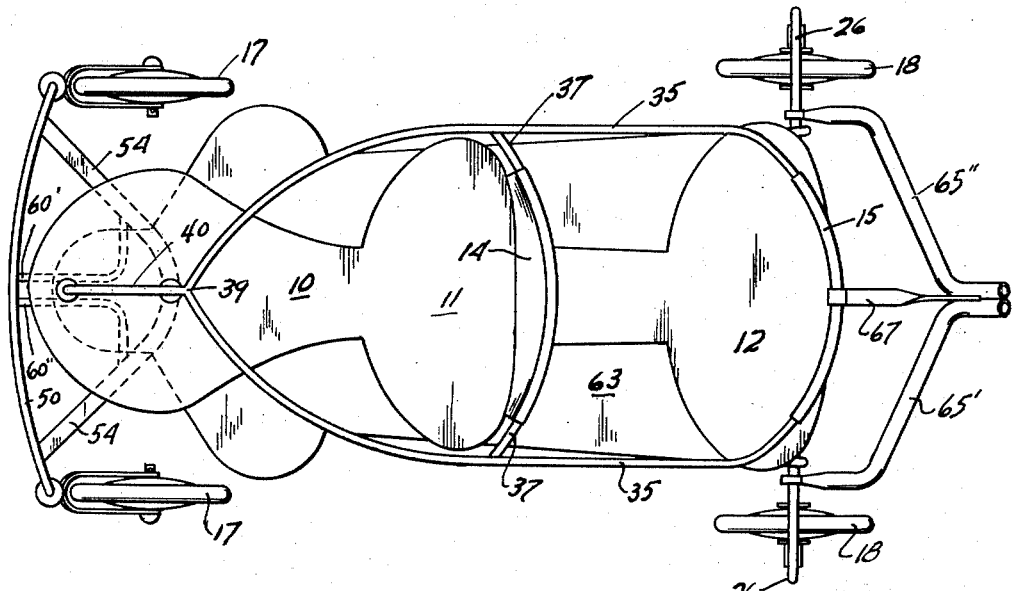
Fig. 1 is a plan view of a tandem baby walker embodying the invention.
Figure 2:
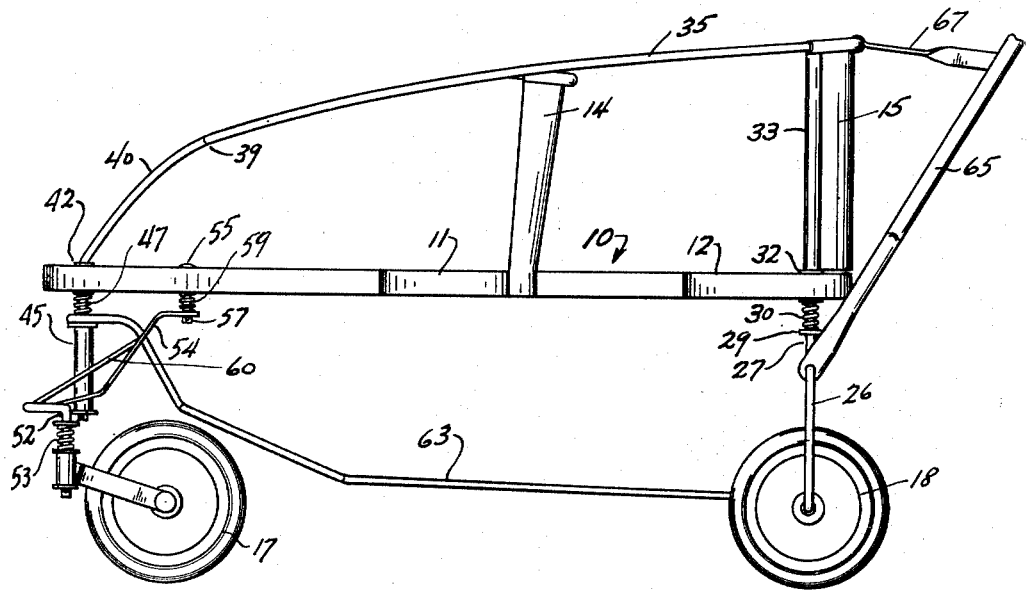
Fig. 2 is a side elevational view of the walker shown in Fig. 1.

In the drawings, and referring particularly to Figs. 1 to 4 inclusive, the baby walker, or stroller, is built on a base 10, which is formed with two seats 11 and 12 in tandem, Fig. 1, each seat being adapted to accommodate one child. Back rests 14 and 15 are provided for the front and rear seats, respectively, to enable the child to lean back in comfort.

The base 10 is supported from the ground by a pair of caster wheels 17—17 at the front of the base 10 and a pair of wheels 18—18 at the rear of the base 10.

The wheels 18—18 at the rear end of the stroller are carried on an axle 20—20. The axle 20—20 is divided at the center of the stroller and extends horizontally as at 21 (see Fig. 4) to receive the wheels 18—18. The inner ends of the axle 20—20 are joined together by a sleeve 23 and held by cotter pins 24—24.

The horizontal portions 21 of the axle 20—20 extend through the wheels which may be secured thereon in any convenient manner, such as by cotter pins 25—25.

The outer ends of the axle 20—20 extend through the wheel and curve backwardly and up as shown at 26—26 over the wheel and terminate in vertical projections 27—27 which pass through the base 10. The curved portions 26 act as guards for the wheels and protection for furniture.

The vertical projections 27—27 have washers 29—29 fixed thereon, which seat the lower ends of springs 30—30. The upper ends of the springs 30—30 support the base 10 and provide suitable resilience for the seats 11 and 12 to absorb road shock from the rear wheels.

The upward movement of the seat on the projections 27—27 is limited by washers 32—32 fixed on the projection. The portion of the projections 27—27 above the washers 32—32 pass through reinforcing ribs in 33—33 in the back rest 15 and are secured to a retaining rod 35 which passes through the back 15 and forms a support for both back rests 14 and 15 and a guard to retain children in both seats 11 and 12.

The forward back rest 14 is secured to the base 10 at the lower end and has a support rod 37 passing through the upper end. Both ends of the rod 37 are secured to the rod 35, which supports the back rest 14.

The front ends of the rod 35 are joined together at 39 and have a rod 40 secured thereto at the junction 39, preferably by welding. The rod 40 extends downwardly and passes through the base 10 adjacent the front end thereof. The base 10 is held in fixed position relative to the rod 40 by a washer 42 secured on the rod 40.

The rod 40 extends vertically downwardly from the base 10 and is received in a sleeve 45 which supports the front wheel assembly. A spring 47 is interposed between the top of the sleeve 45 and the bottom of the base 10 to provide suitable resilience for the base.

The front wheel structure is built on a curved bumper rod 50, which has downturned ends 52—52 which form pivotal supports for the front caster wheels 17. Suitable springs 53 are interposed between the bumper 50 and the caster wheels to absorb road shock. The bumper rod 50 has a curved strap support 54 fixed at its outer ends to the outer portions of the bumper rod. The center of the support 54 is connected with the base by means of a bolt 55, which passes through both the base 10 and the strap support 54. A nut 57 retains the base 10 and the support 54 assembled. A spring 59 is interposed between the base 10 and the support 54 to absorb road shock.

A reinforcing member 60 comprising a pair of rods 60' and 60'' is connected to the central part of the bumper 50 and to the sleeve 45. The ends of the rods 60' and 60'' are bent outwardly and are connected to the support 54 by welding.

A foot rest 63 is carried between the top of the sleeve 45 and the rear axle, and provides a support for the children's feet when the stroller is being propelled by an adult.

A handle 65 may be formed of two rods 65' and 65'' spot welded together to form the body of the handle. The lower ends of the handle are spread apart and are attached to the opposite sides of the stroller on the extension of the axles 20—20 above the curved portions 26—26. A support 67 joins the top of the rear back rest 15 with the rods 65'—65''.

The upper ends of the rods 65'—65'' are also spread apart and are secured in that position by a hand bar 68.

In the form of the invention shown in Fig. 5 and 6 an alternate construction for the front wheels is shown.

Referring to Figs. 5 and 6 the rod 40 projects downward vertically through the base 10 and is received in a sleeve 70. A spring 71 is interposed between the top of the sleeve 70 and the base 10 to absorb the road shock from the front wheel.

An axle rod 73 is fixed at its center to the sleeve 70 by welding or other suitable means. The axle rod curves downwardly and rearwardly and terminates in a pair of alined horizontal axles 77 which receive wheels 79. The axis of rotation of the wheels being offset from the vertical axis of rotation about the rod 40 permits the front end of the stroller to move in the direction urged.

In practice the stroller may be used with the handle 65 and the foot rest 63 to transport one or two children. As an alternate method of use, the handle 65 and the foot rest 63 may be removed and one or two children be placed in the stroller and permitted to propel it by means of their feet. In this action the bumpers 26 and 50 act to protect the furniture.

It will be realized that the hereinbefore described form of the invention is to be taken merely as a preferred embodiment thereof, and that various changes in size, shape and arrangement of parts may be made without departing from the spirit of the invention or the scope of the subjoined claims.

That which is claimed as new and is desired to be secured by United States Letters Patent is:

1. In a child's stroller of the character described, a base adapted to form a seat for the child, a wheel pivotally mounted from the front end of said base, a rear axle having the lower portion extending horizontally through a pair of rear wheels, said axle being bent upwardly and inwardly over the rear wheels and extending vertically through the base and a back rest for said base supported by the upwardly projecting end of the axle.

2. In a child's stroller of the character described, a base adapted to form a seat for the child, a wheel pivotally mounted from the front end of said base, a rear axle having the lower portion extending horizontally through a pair of rear wheels, said axle being bent upwardly and inwardly over the rear wheels and extending vertically through the base, springs mounted on the vertical portions of said axle to support the base resiliently from the wheels and a back rest for said base extending above the base and supported by the vertically projecting ends of the axle.

3. In a child's stroller of the character described, a base adapted to form a seat for the child, a wheel pivotally mounted from the front end of said base, a rear axle having the lower portion extending horizontally through a pair of rear wheels, said axle comprising two pieces joined together at their ends on the lower horizontal portion thereof, said axle being bent upwardly and inwardly over the rear wheels and extending vertically through the base, and a back rest for said base supported by the upwardly projecting end of the axle.

4. In a child's stroller of the character described, a base adapted to form a seat for the child, a wheel pivotally mounted from the front end of said base, a rear axle having the lower portion extending horizontally through a pair of rear wheels, said axle comprising two pieces joined together at their ends on the lower horizontal portion thereof, said axle being bent upwardly and inwardly over the rear wheels and extending vertically through the base, and springs mounted on the vertical portions of said axle to support the base resiliently from the wheels.

5. In a child's stroller of the character described, a base adapted to form a seat for the child, a wheel pivotally mounted from the front end of said base, a rear axle having the lower portion extending horizontally through a pair of rear wheels, said axle comprising two pieces joined together at their ends on the lower horizontal portion thereof, said axle being bent upwardly and inwardly over the rear wheels and extending vertically through the base, springs mounted on the vertical portions of said axle to support the base resiliently from the wheels, and a back rest for said base extending above the base and supported by the vertically projecting ends of the axle.

6. In a child's stroller of the character described, a base and means to support said base from wheels, said means comprising a curved bumper having downturned ends, caster wheels pivotally mounted on said downturned ends, a support secured to said bumper adjacent the outer ends thereof, means to secure the central portion of said support to said base, a post mounted from said base and support members secured to the central part of said bumper, to the post and to the first named support.

7. In a child's stroller of the character described, a base and means to support said base from wheels, said means comprising a curved bumper having downturned ends, caster wheels pivotally mounted on said downturned ends, springs mounted on the downturned ends of the bumper to support said casters resiliently therefrom, a support secured to said bumper adjacent the outer ends thereof, means to secure the central portion of said support to said base, a post mounted from said base and support members secured to the central part of said bumper, to the post and to the first named support.

RUDOLPH WALLNER.

References Cited in the file of this patent
UNITED STATES PATENTS

| Number | Name | Date |
|---|---|---|
| 145,298 | Hazelip | Dec. 9, 1873 |
| 218,679 | Lavancey | Aug. 19, 1879 |
| 564,678 | Woodward | July 28, 1896 |
| 912,035 | Schaefle | Feb. 9, 1909 |
| 1,237,509 | Griswold | Aug. 21, 1917 |
| 1,341,768 | Watson | June 1, 1920 |
| 1,388,756 | Peters | Aug. 23, 1921 |
| 1,409,331 | Bestimt | Mar. 14, 1922 |
| 1,782,330 | Werlich | Nov. 18, 1930 |
| 1,912,040 | Putnam | May 30, 1933 |
| 2,322,890 | Slack | June 29, 1943 |